Patented June 24, 1947

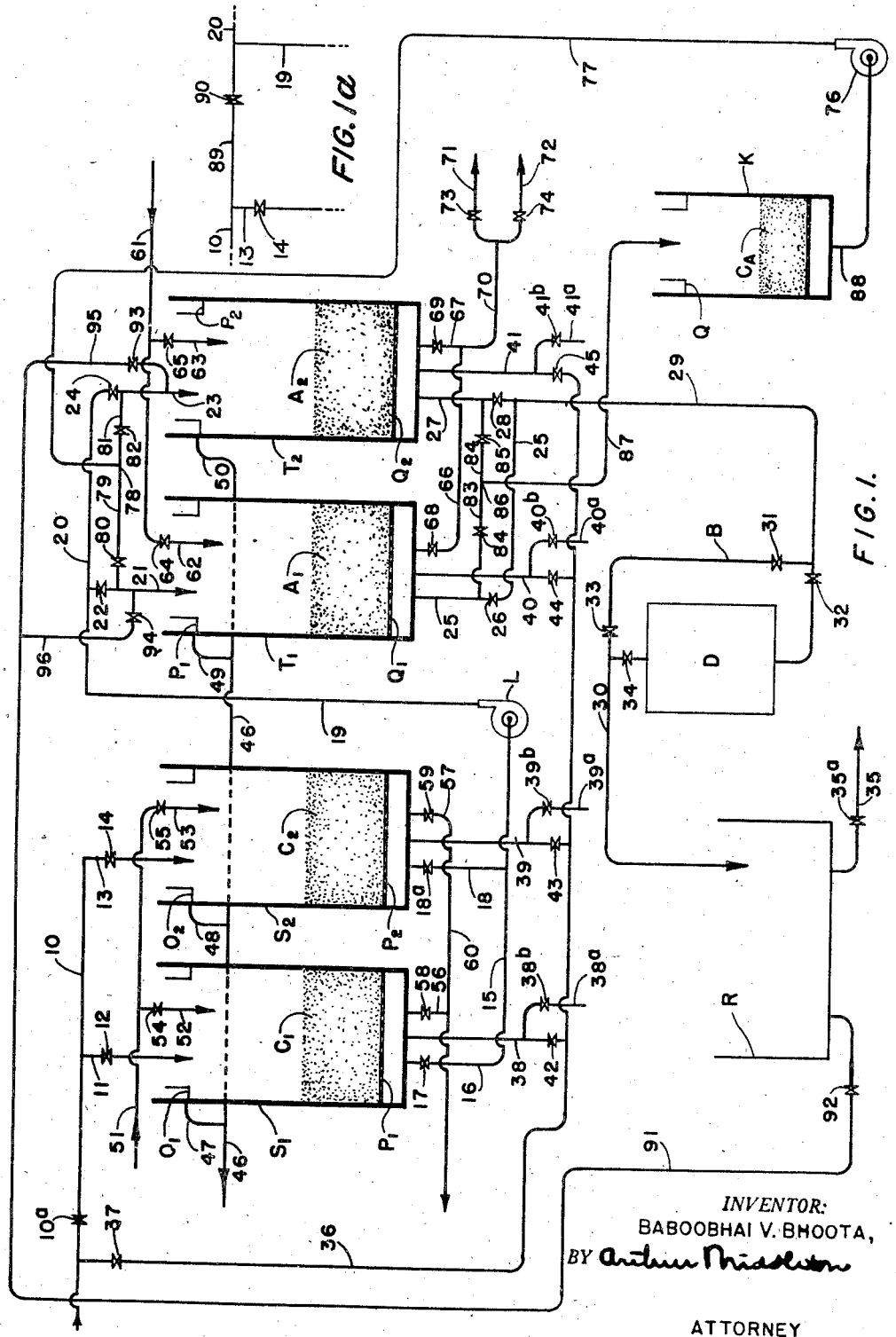

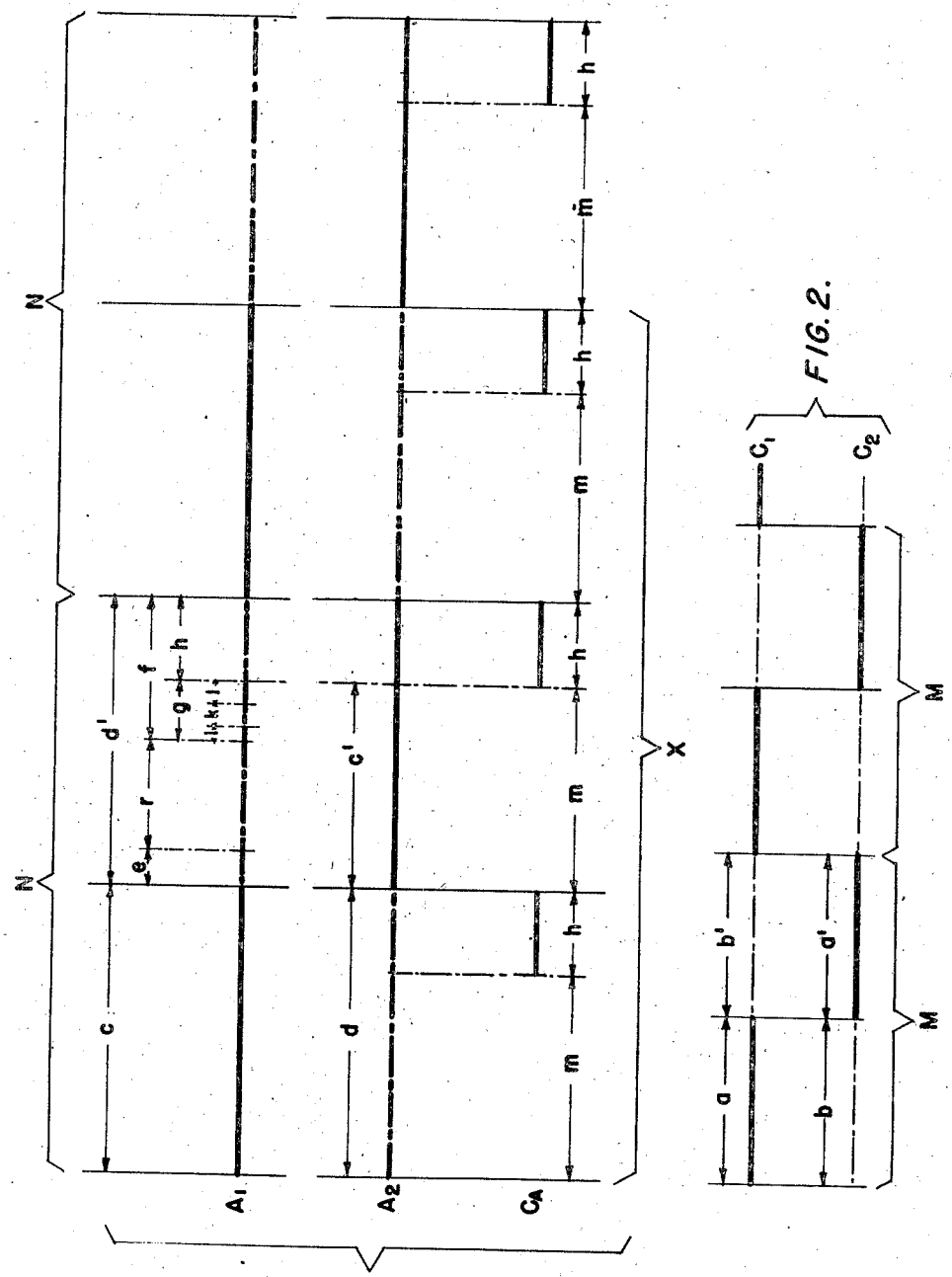

2,422,821

UNITED STATES PATENT OFFICE 2,422,821

LIQUID PURIFIER HAVING CATION EXCHANGERS COMMUNICATING SELECTIVELY WITH ANION EXCHANGERS

Baboobhai V. Bhoota, New York, N. Y., assignor to The Dorr Company, New York, N. Y., a corporation of Delaware Application July 22, 1944, Serial No. 546,141

3 Claims. (Cl. 210—24)

This invention relates to ionic exchange treatment of liquids, and more in particular to the ionic purification or so-called de-ionization thereof.

Such de-ionization removes cations as well as anions of salts in a liquid. In this way one may produce the equivalent of distilled water from waters containing natural salts in solution. One may de-ionize other solutions, for instance, sugar juices to remove dissolved impurities or salts therefrom. However, by way of example this invention will be described in connection with the de-ionization treatment of water, whereby the equivalent of distilled water is produced from a raw water supply.

The principle of such treatment comprises the known practice of passing water through a cation exchanger bed and an anion exchanger bed in sequence. The cation exchanger bed is effective to replace with H-ion the cations of the salts dissolved in the water thereby producing therein the corresponding acid. The thus acidified water in passing through a bed of anion exchanging or acid adsorbing material has thereby the acid removed therefrom. Whenever either one of these exchanger beds has become exhausted, it must be regenerated by contact with a solution of suitable regenerant chemical, and then washed or rinsed free of any residual chemical before it can be put back into the service of treating the raw water. This treatment principle comprises regenerating an exhausted cation exchanger bed with a strong acid such as $H_2SO_4$ or HCl of a suitable concentration to restore the H-ion exchanging capacity of the bed, and regenerating an exhausted anion exchanger bed with a strong alkali such as $Na_2CO_3$ or NaOH of a suitable concentration to restore its acid adsorbing capacity.

While such treatment operation must in a sense be intermittent because of the alternate exhaustion and regeneration constituting an operating cycle of a bed, it may be rendered quasi-continuous by providing at least two pairs of cation and anion exchanger beds and operating them in alternation, whereby one bed can be kept in service while the other is being regenerated and vice versa. The present invention relates to such quasi-continuous operation.

A difficulty has been experienced in the rinsing phase in the acid adsorbing operating cycle because of the reluctance of the regenerated acid removal or anion exchange material to give up the last traces of the regenerant chemical. Hence, in the past the rinsing operation has required an excessive quantity of rinse water eventually going to waste and out of proportion to the quantity of raw water being treated. Moreover, it has been customary to condition the rinse water for the anion-exchange bed by first passing it through the cation exchange bed in order to remove such cations as Mg that would react unfavorably with the residual regenerant alkali in the anion bed, causing therein undesirable precipitates. That is to say, in the presence of alkali the Mg salts (such as $MgCO_3$) may precipitate as magnesium hyroxide $Mg(OH)_2$ upon the exchanger material fouling the same. Hence an excessive rinse water requirement for the anion exchanger bed in turn requires corresponding extra cation exchange capacity for conditioning the rinse water.

Hence further particularized, this invention can be said to relate to improvements in conducting the rinsing phase in the quasi-continuous operation of the anion exchange cycle.

It is among the objects of this invention in quasi-continuous operation to reduce the rinse water requirement; to reduce the rinsing time for the anion exchange bed; to relatively reduce the length of the time cycles for the operation of the exchanger beds and thus make possible more effective utilization of the exchanger material in cyclic operation; to relatively reduce the requirement of exchanger material that must be placed in cyclic operation for a given amount of raw water treatment; to relatively reduce the requirements of regenerant chemical by a manner of exhausting and regenerating of the beds.

Another object is to render flexible such quasi-continuous operation in the sense that the respective operating cycles of the beds are enabled to function efficiently in spite of changes of the analysis of the raw water.

These objects are attained by coordinating the time cycles of the cation beds with respect to one another, and similarly the time cycles of the anion beds with respect to one another, in a manner that the beds are utilized efficiently at a minimum requirement in regenerant chemical; yet allowing the time cycle of the cation beds to function independently of the time cycle of the anion beds; and providing for recirculation of the rinse water through the respective anion bed over a separate or auxiliary cation exchange station. As the rinse water recirculates, it picks up residual regenerant alkali such as $Na_2CO_3$ from the anion bed, then passing through the auxiliary cation bed the Na-ions exchange for H-ions, making carbonic acid ($H_2CO_3$) which is removable from the water by de-gasification.

The service of the auxiliary cation bed is required intermittently, that is, during the latter part of the rinsing period of a plurality of anion exchange operating cycles. That is to say, the exhaustion of the auxiliary bed is effected by a sequence of recirculation periods having intervening off-periods during which the bed is left inactive while the anion bed is being subjected to backwashing and regeneration proper. This auxiliary bed may be of small and economical size, but of a capacity sufficient to last for a plurality of anion exchange operating cycles, yet capable of being regenerated during one of the off-periods.

According to one feature, the raw water contains salts representing chlorides and sulfates which, when passed sequentially through a cation bed and an anion bed, are completely removed. It also contains carbonates which in passing through the cation exchange phase are converted to carbonic acid which is not affected by the anion exchange material, but may be removed from the exchange treated water by a subsequent degasification treatment step. An exhausted cation bed is regenerated as the need arises and in a time cycle which is independent from and which need not coincide with the operating time cycle of the anion beds. As for the anion bed, if one of them is being regenerated, the rinse water that is being circulated through it and through the auxiliary cation exchange bed eventually also becomes de-ionized in the course of this recirculation although it is finally left containing carbonic acid to the extent that residual alkali has been removed or rinsed from the anion bed. After the last traces of the alkali have been rinsed out of the anion bed, the recirculation is stopped and the volume of water that was in recirculation may be saved by displacing it from the anion bed as the flow of production water is re-directed through the anion bed. That is to say, the residual recirculation rinse water in being thus displaced becomes part of the production water that is sent on through the degasifying step.

According to another feature, the regeneration phase of the anion exchange bed comprises—(a) a period of backwashing the exhausted bed by an upflow of wash water throwing the exchange material into suspension or teeter to flush any solid phase impurities therefrom; (b) the regeneration period proper in which the regenerant solution is passed through the bed; and (c) a period of rinsing which comprises re-cycling the final portion of the rinse effluent through the anion exchange bed and the cation exchange bed.

The auxiliary bed provides sufficient capacity to absorb the residual alkali from a plurality of anion bed exchange cycles, yet its capacity is also fixed in such a manner as to render it capable of being regenerated during an off-period, that is, a period between the rinsing phases of the anion beds.

According to another feature specifically relating to the manner of conducting the rinsing phase, that phase comprises a period of straight rinsing whereby spent regenerant alkali is displaced from the anion bed and sent to waste, whereby subsequently unspent regenerant alkali solution of considerable strength is displaced from the bed and saved for re-use, whereby further rinse water effluent containing a suitable portion of dilute or trailing regenerant alkali is also discharged from the system and whereby the final and highly dilute portion of the residual or trailing alkali is disposed of by recirculating the effluent rinse water in the manner above defined; that is to say, when conducting the rinsing phase in this manner, the off-period of the auxiliary bed includes certain straight rinsing periods in addition to the regeneration period proper.

Still further features provide for various modifications in the application of rinse water, namely, the use as rinse water of raw water containing none or a negligible amount of magnesium salts, or of raw water that has passed through the cation exchange stage whereby its metallic ions have been replaced by H-ions, or of previously treated or de-ionized water taken from storage.

It is among the advantages obtainable by the method of this invention that the time cycle of the cation beds as well as the time cycle of the anion beds can be adjusted individually to obtain the best possible utilization of the exchanger materials and of the regenerant chemicals, along with the quasi-continuous operation as a whole; that is to say, the exchanger materials are well utilized since they are substantially never left idle, being employed either in the exhaustion or in the regeneration phase of the cycle. Also, because of this independence of the time cycles the respective cation and anion exchange beds can be exhausted independently of each other and to a degree where a relative minimum of regenerant chemical is required. In other words, since the beds need never be left incompletely exhausted there need be no occasion of an incompletely exhausted bed requiring a relatively larger expenditure of chemical for regeneration than a fully exhausted bed.

This invention involves what may be called the proper timing of the beds regarding the length of the exhaustion and regeneration phases of their operating cycles. This adjustment can be realized in view of the fact that the regeneration time of a certain depth of a certain exchanger material is fixed. If a certain depth has been found to be the most appropriate one, that fixes the time required for regeneration, leaving the diameter of the bed or else its effective cross-section a variable to be determined in view of the volume and analysis of the raw liquid to be treated. Vice versa, the effective depth of the bed and the volume of water to be treated might be varied within suitable limits in case the cross-section of the bed is fixed. However, once these determinations have been made, the main factor of adjustment lies in varying the time cycles of the respective cation and anion exchange beds although limited variation of the bed depth or the liquid volume may be employed for additional timing in coordination with the setting of the time cycles.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a diagrammatic showing of the system for quasi-continuous de-ionization of liquids;

Fig. 1a is a detailed showing of a modification of the system;

Fig. 2 is a time cycle diagram for the alternate or time-interlocked operation of the two cation exchange beds;

Fig. 3 is a time cycle diagram for the alternate time-interlocked operation of the two anion exchange beds operating in closed circuit with the auxiliary cation exchange bed.

Fig. 1 shows in diagram fashion a pair of tanks $S_1$ and $S_2$ containing granular cation exchange material in the form of beds $C_1$ and $C_2$ respectively supported, for example, on perforated plates—so-called constriction plates $P_1$ and $P_2$ respectively, and having overflow launders $O_1$ and $O_2$ respectively; and another pair of tanks $T_1$ and $T_2$ containing granular anion exchange material in the form of beds $A_1$ and $A_2$ respectively supported on constriction plates $Q_1$ and $Q_2$, and having overflow launders $P_1$ and $P_2$ respectively; and a relatively smaller tank K containing cation exchange material in the form of an auxiliary bed $C_A$ and provided with an overflow launder Q. These tanks are provided with a system of pipes and valves for operating the exchange beds $C_1$, $C_2$, $A_1$, $A_2$, $C_A$ in their respective cycles and in a manner to effect quasi-continuous de-ionization of a supply flow of raw water containing ionized solutes such as chlorides, sulfates, and carbonates.

The cation exchanger beds $C_1$ and $C_2$ will herein simply be termed cation beds. Yet it should be understood that the cation beds as herein used are capable of taking up cations from the solutes in the raw water being passed therethrough in exchange for H-ions which are thus released from the exchanger into the water. As a result an effluent emerges from this cation exchange that is proportionately acidified. Cation exchanger materials thus operating in the so-called H-ion cycle are therefore also called H-ion exchangers.

The anion exchange beds $A_1$ and $A_2$ will herein also simply be called anion beds, although it should be understood that their function is to treat the acidified effluent from the cation bed in a manner whereby the metallic acids are adsorbed by the exchanger, leaving in the treated water practically nothing but carbonic acid resulting from the carbonate content in the raw water and removable in the de-gasifying step.

The de-ionization operation is represented by the following typical examples of exchange reactions:

*Cation exchange reactions*

For $CaSO_4$ in the raw water:

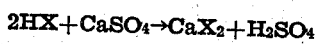

For NaCl in the raw water:

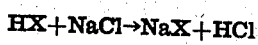

where X represents the structure of the cation exchange material.

*Anion exchange reactions (acid removal)*

For $H_2SO_4$ removal:

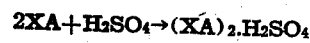

For HCl removal:

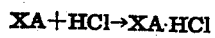

where XA represents the structure of the exchange material with the acid binding substituent A.

One portion of the pipe system provides for selectively connecting one cation bed and one anion bed to work in series on de-ionization of the raw water, while the other cation and anion beds are connected for regeneration. The time cycle of the cation beds may differ from that of the anion beds so that the quasi-continuous de-ionization may be effected at various times by any of the possible combinations of beds, for instance, by bed $C_1$ in series with either bed $A_1$ or $A_2$, or by bed $C_2$ in series with either bed $A_1$ or $A_2$.

This portion of the pipe system comprises a raw water supply header 10 having a main supply valve 10a, a supply branch 11 provided with a valve 12 for bed $C_1$ and another supply branch 13 provided with a valve 14 for bed $C_2$. A corresponding discharge header 15 has a branch 16 provided with valve 17 connecting with the bottom of tank $S_1$ and a branch 18 with valve 18a connecting with the bottom of tank $S_2$. Effluent from the discharge header 15 passes through a pump L into a rising pipe portion 19 into a header 20 capable of supplying tanks $T_1$ and $T_2$ respectively as through a feed branch 21 provided with valve 22 and a feed branch 23 provided with valve 24. Treated water effluent leaves tanks $T_1$ and $T_2$ respectively through discharge pipe 25 provided with valve 26 or discharge pipe 27 provided with valve 28, both discharge pipes joining in a common pipe 29 leading to a de-gasifying station D which through a pipe 30 discharges into a storage tank R for de-ionized water. A by-pass connection B permits to cut out the de-gasifying station D by means of valves 31, 32, 33 and 34. An outlet pipe 35 provided with valve 35a permits to draw de-ionized water from the storage tank.

Another portion of the pipe system provides for selectively back-washing any exhausted cation bed or anion bed with raw water whereby the material of the bed is thrown into a state of suspension or teeter whereby solid phase impurities are washed free of the bed.

For this purpose a raw water supply header 36 branches off the supply header 10 and is provided with a valve 37, and branch feed connections 38, 39, 40 and 41 leading into the bottom of the respective tanks $S_1$, $S_2$, $T_1$, $T_2$ and provided with valves 42, 43, 44, 45 respectively. Each of the exchanger beds if exhausted can thus be back-washed as water under pressure is admitted to the bottom thereof, and allowed to overflow into the respective overflow launders $Q_1$, $Q_2$, $P_1$, $P_2$ of the tanks $S_1$, $S_2$, $T_1$, $T_2$. The upflow rate of back-wash is such that the granules or particles of the bed are thrown into suspension yet without being carried away into the overflow. There is provided an overflow discharge header 46 common to outlet branches 47, 48, 49, 50 from the respective overflow launders of the tanks. After back-washing of the respective beds for a suitable period, the back-wash flow is stopped, and the material of the bed allowed to subside by draining water from the tank to a level below that of the overflow level of the tank. The drainage of the excess water may be effected as by drain outlets 38ª, 39ª, 40ª, 41ª having valves 38b, 39b, 40b, 41b respectively.

Another portion of the pipe system provides for feeding acid regenerant solution such as $H_2SO_4$ to any one of the cation beds, and accordingly discharging spent regenerant solution therefrom.

A supply header 51 for acid regenerant solution serves the cation beds $C_1$ and $C_2$, having branch feed pipes 52 and 53 provided with valves 54 and 55 respectively. Spent regenerant solution having passed through beds $C_1$ and $C_2$ is discharged by way of the respective outlet connections 56 and 57 at the bottom of the beds and through respective outlet valves 58 and 59 into a common discharge header 60.

Another portion of the pipe system provides for feeding alkali regenerant solution selectively to any of the anion beds, and accordingly discharging spent regenerant liquor therefrom.

In the case of the anion beds $A_1$ and $A_2$ a supply header for the alkali regenerant solution is shown at 61, having branch feed pipes 62 and 63 provided with valves 64 and 65 respectively. Corresponding outlet connections 66 and 67 at the bottom of the beds have respective outlet valves 68 and 69 and a common discharge header 70 which in turn terminates in a pair of separate discharge outlets 71 and 72 having valves 73 and 74 respectively for fractionation of the spent regenerant liquor.

Another portion of the pipe system provides for passing rinse water selectively through any one active cation bed and subsequently through any one freshly regenerated anion bed, and accordingly discharging displaced liquid from the anion bed in what may be called the straight rinsing part of the total rinsing period.

For the purpose of rinsing, effluent from an active cation bed may serve in part to supply an active anion bed to produce de-ionized water, and in part to produce rinse water for the other anion bed. That is to say, for rinsing an anion bed effluent may pass from either the cation bed $C_1$ or the cation bed $C_2$ through the outlet connections 16 or 18 and the header 15, pump L, and pipe 19 to the header 20 and branch inlet pipe 21 or 23, to be selectively fed into either bed $A_1$ or $A_2$ as the case may be. The rinse effluent from the anion beds may be disposed of by way of the outlet connections 66 or 67 as the case may be and through the discharge header 70. This may be termed the straight rinsing phase.

However, according to this invention, the rinsing period also comprises a rinse water recirculation phase during which the supply of cation exchange treated rinse water is stopped. That is to say, still another portion of the pipe system provides for recirculating rinse water selectively through any one of the anion beds in circuit with the auxiliary cation bed $C_A$.

Consequently, there is shown a recirculation pump 76 connected with a discharge pipe 77 leading to point 78 where it splits into pipe 79 connecting with the one raw water feed inlet branch 21 through a valve 80, and pipe 81 connecting with the other raw water feed inlet branch 23 through a valve 82. Correspondingly, the treated water outlets 25 and 27 have side connections in the form of pipes 83 and 84 respectively, having respective valves 84' and 85, and joining at 86 in a common discharge pipe 87 feeding into the tank K containing the auxiliary cation exchange bed $C_A$. An outlet pipe 88 leading from the tank K to the intake end of pump 76 completes the recirculation system. The auxiliary bed $C_A$ may be subjected to regeneration with a solution of regenerant acid in a manner similar to that in which the beds $C_1$ and $C_2$ are regenerated although piping connections for that purpose are not especially shown for tank K.

It has been noted above that where the raw water contains magnesium compounds, raw water to be used as rinse water in the anion beds should be pre-treated by passage through an active cation bed to effect removal of the Mg-ions in exchange for H-ions. However, where the Mg-content in the raw water is absent or nil, it may be desirable to use raw water directly as rinse water by sending it (see Fig. 1ª) through a by-pass connection 89 having a valve 90 directly to the anion bed $A_1$ or $A_2$. On the other hand, if desirable, de-ionized water may be used as rinse water by drawing from the storage tank R by way of pipe 91 and through valve 92 provided in pipe 91, and valves 93 and 94 provided in feed branches 95 and 96 respectively of pipe 91.

In order that quasi-continuous de-ionization of a flow of raw water be carried out with a minimum of investment of exchanger bed volume, each time cycle per se, that is, the time cycle of the cation beds on the one hand, and the time cycle of the anion beds on the other hand, should be adjusted or balanced so as to substantially avoid idle periods; that is to say, as far as the operating pattern is concerned each bed should be connected either for the de-ionization of raw water or should be in the process of regeneration, while the operation as a whole should have a sufficient margin of flexibility to be able to absorb some degree of change if it occurs in the analysis of the raw water without thereby incurring any substantial reduction in overall efficiency or utilization of the exchanger material.

In order to meet these requirements, the cation beds $C_1$ and $C_2$ are so balanced relative to each other and with respect to the analysis of the raw water to be treated, that the exhaustion of the one bed requires substantially the same period of time that is required for the regeneration of the other and vice versa. Such an adjusted condition of the cation beds is established on the basis that the regeneration time for a fixed depth of a certain exchanger material is fixed and known, so that the adjustment can be effected by properly correlating the diameter or cross-section of the bed area to the depth of the bed.

With such balanced condition between the cation beds, bed $C_1$ becomes operationally interlocked with bed $C_2$, as represented diagrammatically and idealized in Fig. 2. The time cycle M comprises the exhaustion period (a) of bed $C_1$ (in full line) coinciding with and equal to the regeneration period (b) (in dot and dash line) of bed $C_2$, and vice versa. The regeneration period $b'$ of bed $C_1$ is equal to and coinciding with the exhaustion period $a'$ of bed $C_2$.

A series of such time cycles is shown in Fig. 2 to illustrate quasi-continuous operation.

Similarly (see Fig. 3) the time cycles of the anion beds $A_1$ and $A_2$ are shown to be operationally interlocked in an idealized manner in that the beds are so balanced that the exhaustion period C (in full line) of bed $A_1$ is equal to and coincides with the regeneration period $d$ (in dot and dash line) of bed $A_2$ and vice versa the exhaustion period $C_1$ of bed $A_2$ is equal to and coincides with the regeneration period $d'$ of bed $A_1$. A series of such interlocking time cycles are shown in Fig. 3 to illustrate the quasi-continuous operation. The word "idealized" as herein used with respect to the interlocking of the time cycles in Fig. 2 and in Fig. 3 respectively should be understood to mean that the interlocking in the precise manner shown may be desirable and attainable. However, due to variations in the raw water analysis the actual length of the exhaustion period may, for instance, exceed the actual length of the regeneration period for a bed, in which case a short idle period would have to intervene between regeneration and subsequent exhaustion of the bed, if the interlocked operational pattern as such is to be maintained for the sake of maintaining quasi-continuous operation.

More specifically the regeneration period of an exchanger bed for the present purposes may be said to comprise the component phases of backwashing, regeneration proper, and rinsing. The rinsing period in turn comprises a period of displacing from the bed substantially spent regenerant liquor, a period of displacing from the bed incompletely spent or relatively strong regenerant solution, a period of displacing rinse water containing increasingly dilute or trailing regenerant chemical. These component periods of regeneration phase are indicated in the time cycle diagram of the anion beds $A_1$ and $A_2$ in Fig. 3, inasmuch as this invention comprises recirculation of the final portion of the rinse water containing dilute regenerant chemical.

For example, the regeneration period $d'$ of bed $A_1$ in regard to Fig. 3 is shown to include the backwash period $e$, the regeneration period $r$ proper, the rinsing period $f$ which in turn comprises a straight rinsing period $g$ with the resulting effluent being discharged from the system, and a recirculation rinsing period $h$. The straight rinsing period $g$ in turn may comprise a period $i$ of displacing from the bed spent regenerant solution, a period $k$ of displacing from the bed incompletely spent or relatively strong unspent regenerant solution and a period $l$ in which rinse water containing the initial portion of trailing unspent regenerant chemical flows from the bed.

It should be understood that the sum of the component periods $l$ and $h$ represents that period during which residual chemical that is reluctant to leave the anion bed is being washed therefrom, furnishing rinse water effluent containing what is herein called the trailing regenerant chemical which decreases in strength as the rinsing progresses. Trailing chemical in the rinse effluent is discharged from the system for the length of period $l$ as long as the expenditure of wash water is still considered commensurate with the amount of trailing chemical removed from the bed by the rinsing. At the end of period $l$ the flow of additional rinse water is discontinued while the remaining rinse water in the system is started to flow in a closed circuit comprising the anion bed and the auxiliary cation bed $C_A$ for the length of the period $h$, that is, until the last traces of residual chemical have been washed from the anion bed.

From Fig. 3 it will be noted that the exhaustion of the bed $C_A$ proceeds intermittently over a period $x$ in which the recirculation periods $h$ alternate with idle periods $m$. Let it then be assumed that the auxiliary bed $C_A$ becomes exhausted as shown in Fig. 3 by a sequence of three periods $h$, and that it can be regenerated within the next following period $m$ which otherwise represents an idle period for the bed.

For convenience in interpreting the time cycle diagram of Fig. 3, the designations of the component periods of the regeneration phase of the anion exchanger beds are listed as follows:

*Anion bed: Regeneration*

$d'$ = total length of regeneration phase
$d' = e + r + f$
$e$ = backwash
$r$ = regeneration proper with alkali
$f$ = rinsing
$f = g + h$
$g$ = straight rinsing
$h$ = recirculation rinsing
$g = i + k + l$
$i$ = spent liquor discharge
$k$ = strong unspent solution discharge
$l$ = initial portion of trailing solution discharge Referring to the piping layout in Fig. 1, the operation may be described as follows:

Let the cation bed $C_1$ and the anion bed $A_1$ be in active operation of deionizing raw water, while beds $C_2$ and $A_2$ may be assumed to be undergoing regeneration. Raw water to be treated is supplied at a suitable substantially pre-determined rate through valve 10ª, the supply header 10, and then through valve 12 of branch pipe 11 into the tank $S_1$ of cation bed $C_1$. The passage of the water through the bed is downwardly and so regulated as to maintain the bed in substantially submerged condition. Acidified effluent from bed $C_1$ is shown to pass from the bottom of tank $S_1$ through valve 17 of discharge pipe 16 and then through discharge header 15, pipe 19, header 20, and valve 22 of branch feed inlet pipe 21 into tank $T_1$ of bed $A_1$. Passage of de-ionized water containing carbonic acid from bed $A_1$ is indicated by valve 32 into the degasifier or de-gasifying unit where the carbonic acid is removed. De-ionized de-gasified liquid passes from the unit D through pipe 30 into the storage tank R whence it may be withdrawn through valve 35ª of pipe 35 for general use, or through the valves 92 and 37 of pipe 91 for rinsing, the operation of which will be described further below. A pipe B with valves 31 and 33 permits by-passing the de-gasifying unit D.

After bed $C_1$ has become exhausted, the flow of raw water therethrough must be stopped and the bed regenerated; therefore, the flow of raw water for de-ionization is now continued through bed $C_2$ instead of through $C_1$, bed $C_2$ having been regenerated while bed $C_1$ was active. The effluent from bed $C_2$ passes through valve 18ª of discharge pipe 18 through discharge header 15 and pipe 19 into header 20 whence it may continue through valve 22 of inlet pipe 21 and as before through the anion bed $A_1$ until that bed in turn becomes exhausted, necessitating the switch of cation bed effluent to anion bed $A_2$. The exhausted bed $C_1$ is first backwashed by passing an upflow of raw water therethrough, drawing from the raw water supply through valve 37 of pipe 36 and through valve 42 of bottom feed pipe 38 into tank $S_1$. This upflow of wash water is such as to throw the particles or granules of the bed $C_1$ into suspension or teeter removing or flushing out any solid phase impurities but substantialy without carrying away any of the exchanger material. After sufficient backwashing the upflow of washwater is stopped, and the material allowed to subside. Subsidence is accelerated by drawing excess water through valve 38ᵇ of draw pipe 38ª, still leaving the re-settled bed in submergence. Then follows regeneration proper of the bed $C_1$ by passing therethrough a solution of regenerant acid of suitable dilution, for instance, solution of $H_2SO_4$ or HCl. The solution passes from the supply header 51 and through valve 54 of branch feed pipe 52 into and through the bed in a manner to keep the bed submerged. The spent solution is indicated to leave the bed $C_1$ and its tank $S_1$ as by way of valve 58 in discharge branch pipe 56 leading into discharge leader 60 and thence to disposal. When the bed is fully regenerated, the flow of regenerated solution is stopped, and raw water is started through valve 12 of branch feed pipe 11 down through the bed to rinse out or displace residual regenerant solution which may be discharged through valve 58 and discharge header 60 until the traces of regenerant chemical in the effluent are sufficiently reduced, indicating the conclusion of the regeneration phase. The bed $C_1$ then again takes over the normal flow of raw water for de-ionization, while the regeneration procedure is switched to bed $C_2$ which meanwhile has become exhausted.

The time cycle of the anion beds $A_1$ and $A_2$ proceeds independently of the time cycle of the cation beds. Therefore, let it be assumed that a continuous flow of treated water from the discharge header 15, that is effluent from an active cation bed supplies the anion beds. The anion bed $A_1$ may now be assumed to have been exhausted by such a flow, and to be in need of regeneration, while the meanwhile regenerated bed $A_2$ takes over the anion exchange treatment of the cation bed effluent.

The regeneration phase of bed $A_1$ starts as in the case of the cation beds with a backwash period during which raw water from the supply pipe 36 passes through valve 44 of branch feed pipe 40 into the bottom of tank $T_1$ holding bed $A_1$. The upflow is such as to throw granules or particles into suspension or teeter, yet without causing them to pass out with the overflow discharge. After an adequate period of backwashing, the material of the bed is caused to subside as the backwash flow is stopped, and the drain valve 46$^b$ is opened to lower the liquid level in tank $T_1$ until the re-subsided bed $A_1$ is just about submerged.

Then follows the regeneration period proper in which a solution of a regenerant alkali such as $Na_2CO_3$ is supplied to the bed $A_1$ from the supply header 61 and through valve 64 of branch feed pipe 62. The passage of this solution through bed $A_1$ is continued until the bed is substantially fully regenerated, at which time the supply of regenerant solution is stopped and the supply of rinse water is started. A portion of the effluent from an active cation bed $C_1$ or $C_2$, that is acidified water, serves as rinse water for the anion bed, although completely de-ionized water from storage may also be used for that purpose. The importance of using thus treated waters for rinsing the anion beds lies in the fact that the pre-treatment eliminates Mg-ions if such should be contained in the raw water. As explained further above, the passage of Mg-ions through the anion bed is undesirable because of the potential precipitation of Mg-compounds on the exchanger particles or granules. The rinse water displaces downwardly from bed $A_1$ residual regenerant solution which is being discharged through valve 68 of discharge branch pipe 66, pipe 70, and either through valve 73 of pipe 71 or through valve 74 of pipe 72, to disposal or for some purpose or re-use; that is to say, an initial portion of the residual solution thus being displaced from the bed comprises substantially spent solution which may be sent to waste disposal by way of valve 73 of pipe 71 while a subsequent portion of incompletely spent or unspent solution is passed through valve 74 of pipe 72 for purposes of re-use in a subsequent regeneration operation. The incompletely spent or unspent solution volume may further be subdivided into a volume of relatively strong solution and a volume represented largely by strong unspent solution and a rinse water effluent volume containing trailing unspent regenerant chemical (alkali) in a concentration that grows more and more dilute as the rinse water flow continues, and which shall herein be called the trailing solution.

While this invention calls for recirculation of a portion of the effluent rinse water from an anion bed, according to a feature of specific refinement a further sub-division or distinction is made as between a first and somewhat stronger portion of the trailing solution volume and a second or final and weaker portion of trailing solution. It is this latter and final portion of the trailing solution which it is proposed to recirculate; hence, when this point is reached, the supply of rinse water is stopped and the residual rinse water in bed $A_1$ is recirculated through valve 84 of discharge branch 83, pipe 87, auxiliary cation bed $C_A$, pipe 88, pump intake pipe 88, pump 76, pump discharge and return pipe 77, valve 80 in branch pipe 79, and inlet branch pipe 21. This recirculation is continued until the last traces of regenerant alkali have been washed from the bed $A_1$. The water thus kept in recirculation becomes fully de-ionized and at the end of the recirculation period it is displaced and passed to the de-gasifying unit D by way of valve 26, pipe 25, pipe 29, and valve 32, when normal de-ionization operation is again resumed through bed $A_1$.

When $Na_2CO_3$ is used as the regenerant for the anion bed, the reaction when passing through the bed would be to convert this $Na_2CO_3$ to $H_2CO_3$ (carbonic acid) according to the following equation:

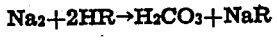

in which R designates the structure of the exchanger material.

When NaOH is used as the regenerant, the passage through the bed $C_A$ will bring about the following reaction:

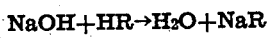

in which case no carbonic acid is developed.

It should be further understood that the de-gasifying treatment step may be dispensed with when the presence of carbonic acid in the treated water is not objectionable or its content in the treated water is negligible due to the substantial absence of carbonates in the raw water.

A pipe connection 89 with valve 90 (see Fig. 1$^a$) is shown to illustrate the operational modification regarding the rinsing phase, according to which raw water may by-pass the cation beds $C_1$ and $C_2$ and flow directly to the anion beds for rinsing. This is in case the raw water contains none or a negligible amount of Mg-compounds.

It will be understood that the operation of the exchanger beds is such that the exchange material is kept in submergence substantially at all times.

While there has been presented in the illustrative example of Fig. 1 a plant in which the cation bed effluent is passed on to the top of the anion beds by means of the transfer pump L, it is also conceivable to substitute gravity operated layout in which the cation bed effluent gravitates to the anion beds.

Again, while in Fig. 1 the treated water effluent from the anion beds is shown to gravitate to the de-gasifying unit D, the arrangement may also be such as to require pumping the treated water to the unit D.

I claim:

1. A system for the quasi-continuous de-ionization of liquids, which comprises supply means for untreated liquid, a pair of cation exchange beds, means for feeding said liquid from said supply means selectively to one of the two cation exchange beds, means for re-conditioning selectively one of the two cation exchange beds when exhausted, a pair of acid-adsorbing exchange beds, means for passing treated liquid effluent from one of the two cation exchange beds selectively to one of the two acid-adsorbing beds, effluent means for discharging selectively from one of the two acid-adsorbing beds liquid having been subjected sequentially in one of said cation exchange beds and in one of said acid-adsorbing beds, means for supplying regenerant alkali solution selectively to one of the two acid-adsorbing beds during an off period thereof, effluent means for discharging spent alkali regenerant solution selectively from one of the two acid-adsorbing beds, means for supplying wash water selectively to one of the two acid-adsorbing beds, wash water effluent means for discharging spent wash water selectively from one of the two acid-adsorbing beds, an auxiliary cation exchange bed, means for passing wash water from said wash water effluent means selectively to said auxiliary bed, discharge means for passing treated wash water having been subjected to cation exchange in said auxiliary bed to that acid-adsorbing bed whence it was passed to the auxiliary bed, and means for reconditioning said auxiliary bed.

2. Apparatus according to claim 1, in which the anion exchange beds for the treatment of a given raw liquid are dimensioned so that the period of exhaustion of the beds is substantially equal to the period of regeneration.

3. Apparatus according to claim 1, in which the time cycle of the cation exchange beds is independent of the time cycle of the anion exchange beds, and in which the cation exchange beds with respect to one another as well as the anion exchange beds with respect to one another are dimensioned for the treatment of a given raw liquid, so that the exhaustion period of one cation bed is substantially equal to the reconditioning period of the other cation bed and vice versa the exhaustion period of said other cation bed is substantially equal to the reconditioning period of said one cation bed, and so that the exhaustion period of one anion bed is substantially equal to the reconditioning period of the other anion bed and vice versa the exhaustion period of the other anion bed is substantially equal to the reconditioning period of the one anion bed.

BABOOBHAI V. BHOOTA.

REFERENCES CITED

The following references are of record in the file of this patent:

UNITED STATES PATENTS

| Number | Name | Date |
|---|---|---|
| 2,248,055 | Bird | July 8, 1941 |
| 2,267,841 | Riley | Dec. 30, 1941 |
| Re. 16,497 | Caps | Dec. 7, 1926 |
| 2,287,284 | Behrman | June 23, 1942 |
| 2,155,318 | Liebknecht | Apr. 18, 1939 |
| 2,164,156 | Liebknecht | June 27, 1939 |
| 2,226,134 | Liebknecht | Dec. 24, 1940 |
| 2,301,669 | Richter | Nov. 10, 1942 |
| 2,354,172 | Myers et al. | July 18, 1944 |
| 2,217,822 | Symons | Oct. 15, 1940 |
| 2,365,221 | Shafor | Dec. 19, 1944 |
| 2,309,363 | Urbain et al. | Jan. 26, 1943 |
| 1,255,359 | Uecke | Feb. 5, 1918 |
| 2,046,265 | Hewetson | June 30, 1936 |
| 1,759,636 | Turner | May 20, 1930 |